US012479117B2

(12) United States Patent
Dong et al.

(10) Patent No.: US 12,479,117 B2
(45) Date of Patent: Nov. 25, 2025

(54) DUAL-POWER MULTI-HEAD ELECTRIC SHAVER

(71) Applicant: ZHONGSHAN ASIABLADE CO., LTD., Zhongshan (CN)

(72) Inventors: Ziyi Dong, Zhongshan (CN); Hua Xiao, Zhongshan (CN)

(73) Assignee: ZHONGSHAN ASIABLADE CO., LTD., Zhongshan (CN)

( * ) Notice: Subject to any disclaimer, the term of this patent is extended or adjusted under 35 U.S.C. 154(b) by 204 days.

(21) Appl. No.: 18/464,576

(22) Filed: Sep. 11, 2023

(65) Prior Publication Data

US 2025/0026036 A1 Jan. 23, 2025

(30) Foreign Application Priority Data

Jul. 19, 2023 (CN) ......................... 202310893424.4

(51) Int. Cl.
*B26B 19/14* (2006.01)
*B26B 19/28* (2006.01)
*B26B 19/38* (2006.01)

(52) U.S. Cl.
CPC .............. *B26B 19/14* (2013.01); *B26B 19/28* (2013.01); *B26B 19/38* (2013.01)

(58) Field of Classification Search
CPC ....... B26B 19/14; B26B 19/28; B26B 19/145; B26B 19/146; B26B 19/3846; B26B 19/386; B26B 14/143; B26B 14/148
See application file for complete search history.

(56) References Cited

U.S. PATENT DOCUMENTS 2,283,834 A * 5/1942 Van Dam .............. B26B 19/145 30/43.5
5,483,745 A * 1/1996 Izumi .................. B26B 19/3873 30/43.6
8,397,388 B1 * 3/2013 Steinberg ................ B26B 19/14 30/43.6
2004/0237308 A1 * 12/2004 Mitchell ................. B26B 19/38 30/346.51

FOREIGN PATENT DOCUMENTS

CN 110948532 A * 4/2020
DE 718390 C * 3/1942

OTHER PUBLICATIONS

CN_110948532_A (Year: 2020).*

* cited by examiner

*Primary Examiner* — Jonathan G Riley
(74) *Attorney, Agent, or Firm* — Che-Yang Chen

(57) ABSTRACT

The invention provides a dual-power multi-head electric shaver, which is characterized by comprising a main body housing and a main body bottom case, wherein a detachable multi-head shaving component is arranged above the main body housing, and the shaving component comprises a plurality of screens; and blades are correspondingly arranged in the screens, a first gear set for driving the blades to rotate is arranged below the shaving component, a second gear set for driving the screens to rotate is arranged in the shaving component, and a first motor and a second motor for respectively driving the first gear set and the second gear set to rotate are arranged in the main body housing. The blades and screens of the invention can both rotate, allowing for easy guiding of long and short hair into the screens for cutting, resulting in a cleaner and more uniform shaving effect.

7 Claims, 9 Drawing Sheets

A—A

DUAL-POWER MULTI-HEAD ELECTRIC SHAVER

BACKGROUND OF THE PRESENT INVENTION

The invention relates to the technical field of shavers, in particular to a dual-power multi-head electric shaver.

DESCRIPTION OF RELATED ARTS

A shaver is a commonly used tool for daily care, often used for trimming beards and body hair, and can also be used by people with short hair to trim their hair. Arranging multiple shaver heads on a shaver can effectively improve shaving efficiency. However, existing multi-head shavers only have rotating blades, while screens remain stationary. This makes it difficult for longer hair to enter the screen to be cut, resulting in uneven and incomplete shaving. Moreover, existing multi-head shavers have a hair trapping problem in the shaving process, leading to a poor user experience.

SUMMARY OF THE PRESENT INVENTION

In order to make a screen of a multi-head shaver rotate during shaving, so as to enhance the shaving effect and improve the user experience, the invention provides a dual-power multi-head electric shaver.

In order to solve the above problems, the invention provides the following technical scheme.

A dual-power multi-head electric shaver comprises a main body housing and a main body bottom case, wherein a detachable multi-head shaving component is arranged above the main body housing, and the shaving component comprises a plurality of screens; blades are correspondingly arranged in the screens, a first gear set for driving the blades to rotate is arranged below the shaving component, a second gear set for driving the screens to rotate is arranged in the shaving component, and a first motor and a second motor for respectively driving the first gear set and the second gear set to rotate are arranged in the main body housing; a gear box is arranged between the shaving component and the main body housing, the gear box is fixedly mounted at a top end of the main body housing, and the first gear set is mounted in the gear box; and the shaving component further comprises a shell and a bottom plate fixedly connected with the shell, and the second gear set is arranged in the shell.

According to the dual-power multi-head electric shaver, the first gear set comprises a driving gear, transmission gears and rotating gears, the driving gear is fixedly mounted on a motor shaft of the first motor, and the transmission gears are located between the rotating gears; and a plurality of transmission connecting rods rotating synchronously with the rotating gears are arranged between the blades and the first gear set, the blades are movably sleeved on upper ends of the transmission connecting rods, and top ends of the rotating gears are connected with lower ends of the corresponding transmission connecting rods.

According to the dual-power multi-head electric shaver, a first groove is formed in a center of a top end of the rotating gear, and a plurality of snap-fit receivers are arranged around the first groove; a second groove is formed in a lower end of the transmission connecting rod, and a plurality of snap-fit heads fitted into the snap-fit receivers are arranged around the second groove; the transmission connecting rod is clamped onto a top end of the rotating gear in a vertically movable manner, a spring is arranged between the rotating gear and the transmission connecting rod to abut against the transmission connecting rod in order to ensure the contact between the blade and the screen, and one end of the spring rests inside the first groove, while the other end rests inside the second groove.

According to the dual-power multi-head electric shaver, the second gear set comprises a first rotating gear, second rotating gears and a power gear, the power gear rotates synchronously with a motor shaft of the second motor, and the power gear meshes with the first rotating gear; and the plurality of second rotating gears are distributed around the first rotating gear, and the first rotating gear meshes with the plurality of second rotating gears.

According to the dual-power multi-head electric shaver, the screens comprise a first screen and second screens, and the first screen and the second screens are fixedly mounted on the first rotating gear and the second rotating gears respectively and rotate synchronously therewith; the first rotating gear is hollow, slots are formed in an inner wall of the first rotating gear, a sleeve part is fixedly mounted on the first screen, and an exterior surface of the sleeve part is provided with ribs inserted into the slots; and snap-fit points are arranged on two sides of an upper end of the second rotating gear, and snap-fit rings for locking the snap-fit points are arranged on an outer side of a lower end of the second screen.

According to the dual-power multi-head electric shaver, a transmission rod is fixedly mounted on the motor shaft of the second motor, an engage groove is formed in a top end of the transmission rod, and an engage tooth inserted into the engage groove is arranged at a bottom end of the power gear.

According to the dual-power multi-head electric shaver, the first screen and the second screens are sleeved with a first sleeve shell and second sleeve shells respectively, the first sleeve shell is located at a center of the shell, and the second sleeve shells are distributed on a periphery of the shell; and insertion holes are formed in two sides of the second sleeve shell, rotating shafts inserted into the insertion holes are correspondingly arranged in the shell, a downward extending positioning post is arranged at a center of an inner top of each screen, and a positioning hole for receiving the positioning post is formed in a top end of each blade.

According to the dual-power multi-head electric shaver, an upper surface of the shell is provided with a plurality of hair guiding grooves for guiding hair to the screens, the bottom plate is provided with a plurality of cleaning holes, and dustproof pads are arranged at a top end of the gear box and sleeved on the transmission connecting rods to prevent hair from falling into the gear box.

According to the dual-power multi-head electric shaver, a top surface of the gear box is provided with first magnetic parts, and a bottom surface of the bottom plate is correspondingly provided with second magnetic parts which attract the first magnetic parts.

According to the dual-power multi-head electric shaver, a control circuit board and a battery are arranged in the main body housing, and a key switch and a charging interface are arranged on the main body bottom case.

Compared with the prior art, the invention has the following advantages.

1. The dual-power multi-head electric shaver of the invention is provided with the first gear set, the second gear set, the first motor and the second motor, and the dual-motor structure can simplify a transmission structure of the gear sets and facilitate the adjustment of a rotating speed ratio between the motors and the gears; the first motor and the second motor respectively drive the first gear set and the second gear set to rotate, so that the blades of the shaver heads rotate rapidly to cut hair, and the screens of the shaver heads rotate slowly, allowing long hair to be captured in the screens to be cut, so that a thorough shaving effect is realized; moreover, the slow rotation of the screens enables short hair to easily enter from various directions, resulting in a cleaner and more uniform shaving effect; furthermore, the rotating direction of some screens is the same as that of the blades, while the rotating direction of other screens is opposite to that of the blades, and the rotating speed of the blades is far greater than that of the screens, thus ensuring the cutting effect of the multi-head electric shaver.

2. According to the dual-power multi-head electric shaver of the invention, the first screen and the second screens are respectively sleeved with the first sleeve shell and the second sleeve shells; the first sleeve shell and the first screen are located at the center of the shell to allow hair in all directions to be guided into the first screen, without the need of rotating adjustment of the shaving angle of the first screen; and the second sleeve shells and the second screens are distributed on the periphery of the shell, the inclination angle of the second screen can be adjusted through the insertion hole and the rotating shaft, and the second screen can be adjusted according to the surface radian of a shaved area, allowing an optimal angle with the skin during shaving, so as to enhance the shaving effect and user experience of the multi-head electric shaver.

3. According to the dual-power multi-head electric shaver of the invention, the shaving component is detachable, the blades are movably sleeved on the upper ends of the transmission connecting rods, and the shaving component and a main body are connected by magnetic attraction; and after the multi-head electric shaver is used, the shaving component can be removed for cleaning, the bottom plate is provided with the plurality of cleaning holes, and hair in the shaving component can be easily poured out or directly washed off through the cleaning holes, realizing easy cleaning.

Figure 1:
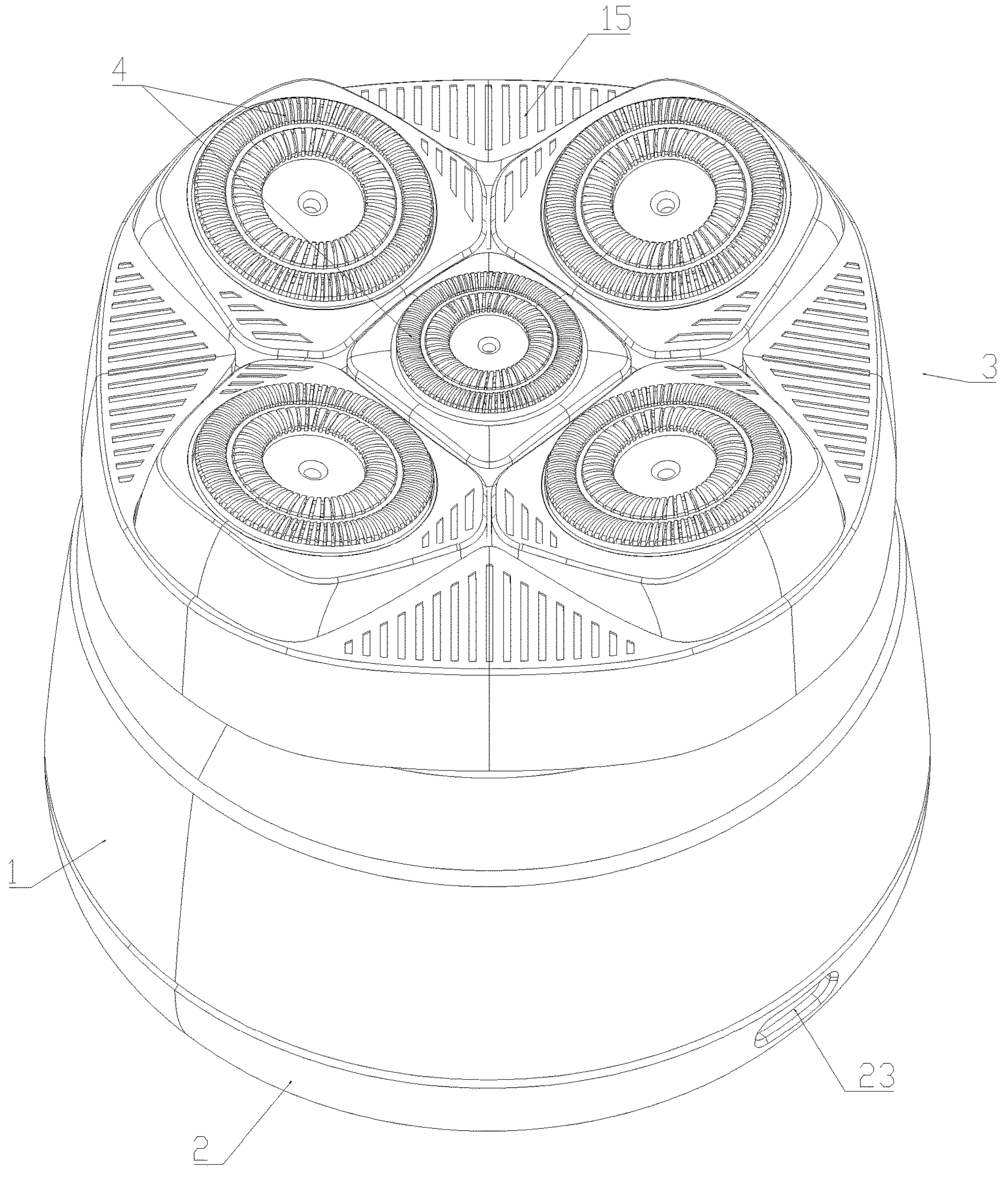
FIG. 1 is a perspective view of the multi-head electric shaver.

Included in the drawings are: 1 main body housing; 2 main body bottom case; 3 shaving component; 301 shell; 302 bottom plate; 303 first sleeve shell; 304 second sleeve shell; 305 insertion hole; 306 rotating shaft; 4 screen; 401 first screen; 402 second screen; 403 positioning post; 404 sleeve part; 405 rib; 406 snap-fit ring; 5 blade; 501 positioning hole; 6 gear box; 7 first gear set; 701 driving gear; 702 transmission gear; 703 rotating gear; 704 snap-fit receiver; 8 second gear set; 801 first rotating gear; 802 second rotating gear; 803 power gear; 804 slot; 805 snap-fit point; 806 engage tooth; 9 transmission connecting rod; 901 snap-fit head; 10 spring; 1001 first groove; 1002 second groove; 11 first motor; 12 second motor; 13 transmission rod; 14 engage groove; 15 hair guiding groove; 16 cleaning hole; 17 dustproof pad; 18 control circuit board; 19 battery; 20 key switch; 21 first magnetic part; 22 second magnetic part; 23 charging interface.

DETAILED DESCRIPTION OF THE PREFERRED EMBODIMENT

The technical features of the invention will be further described in detail with reference to the attached drawings, so that those skilled in the art can understand, and the upper, lower, left and right positions described herein are consistent with those shown in the attached drawings.

Figure 2:
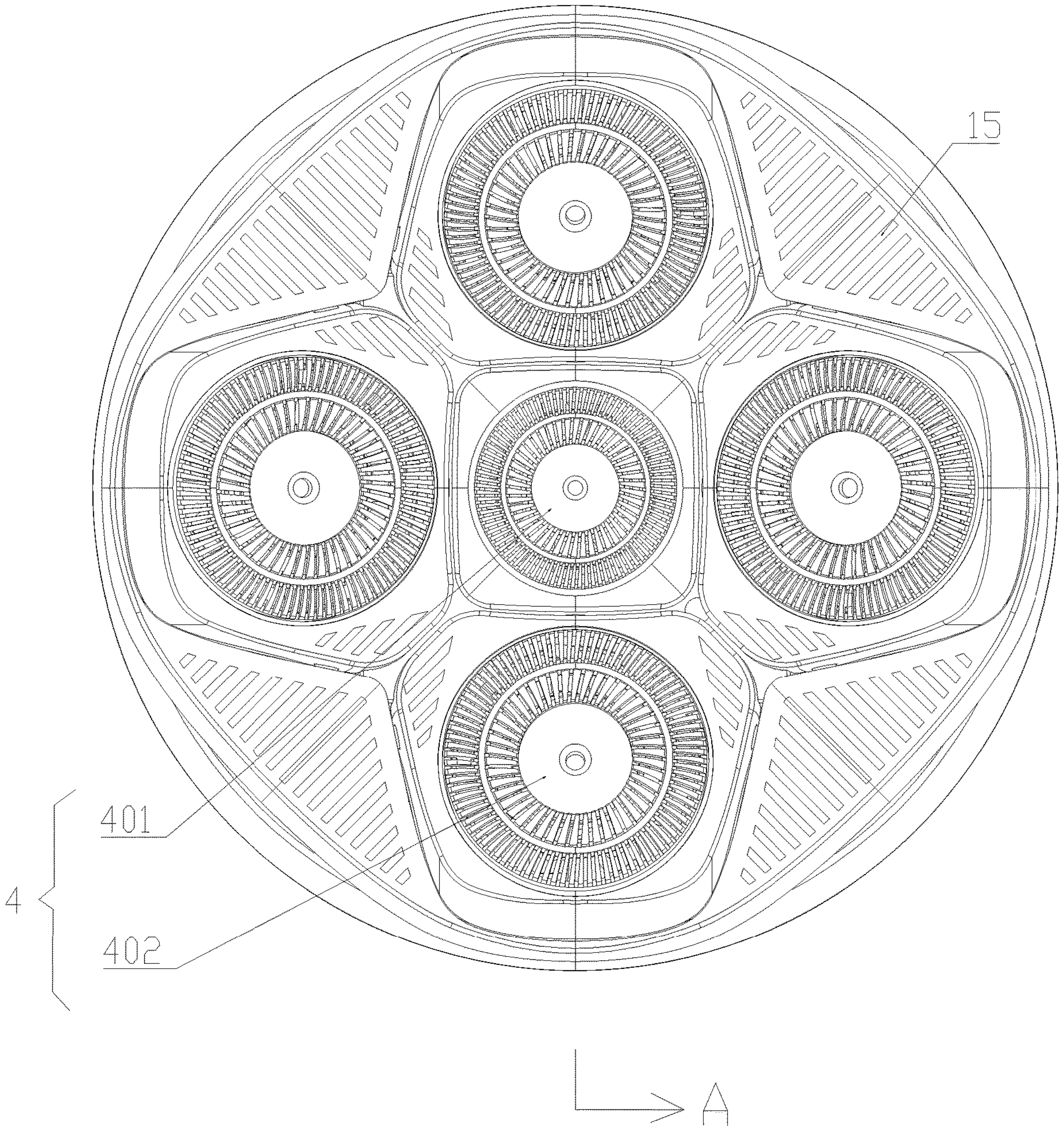
FIG. 2 is a top view of the multi-head electric shaver.
Figure 3:
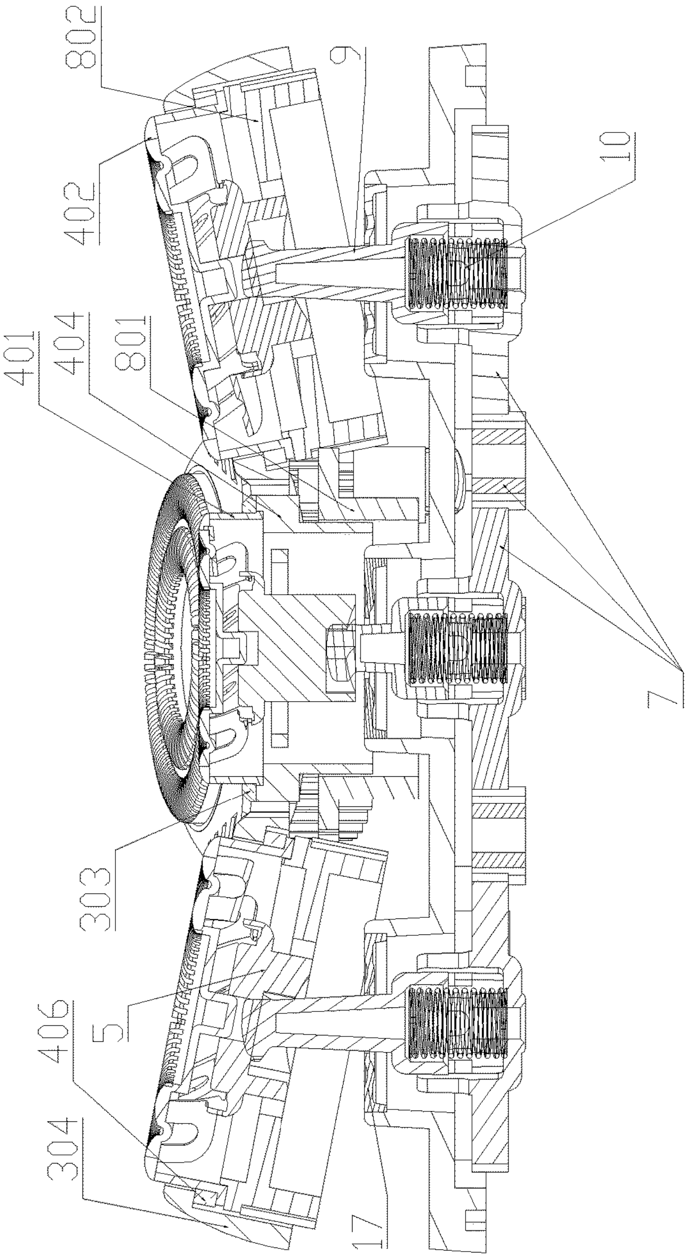
FIG. 3 is a sectional view taken along the line A-A in FIG. 2, in which a main body and a shell of shaver heads are hidden.
Figure 4:
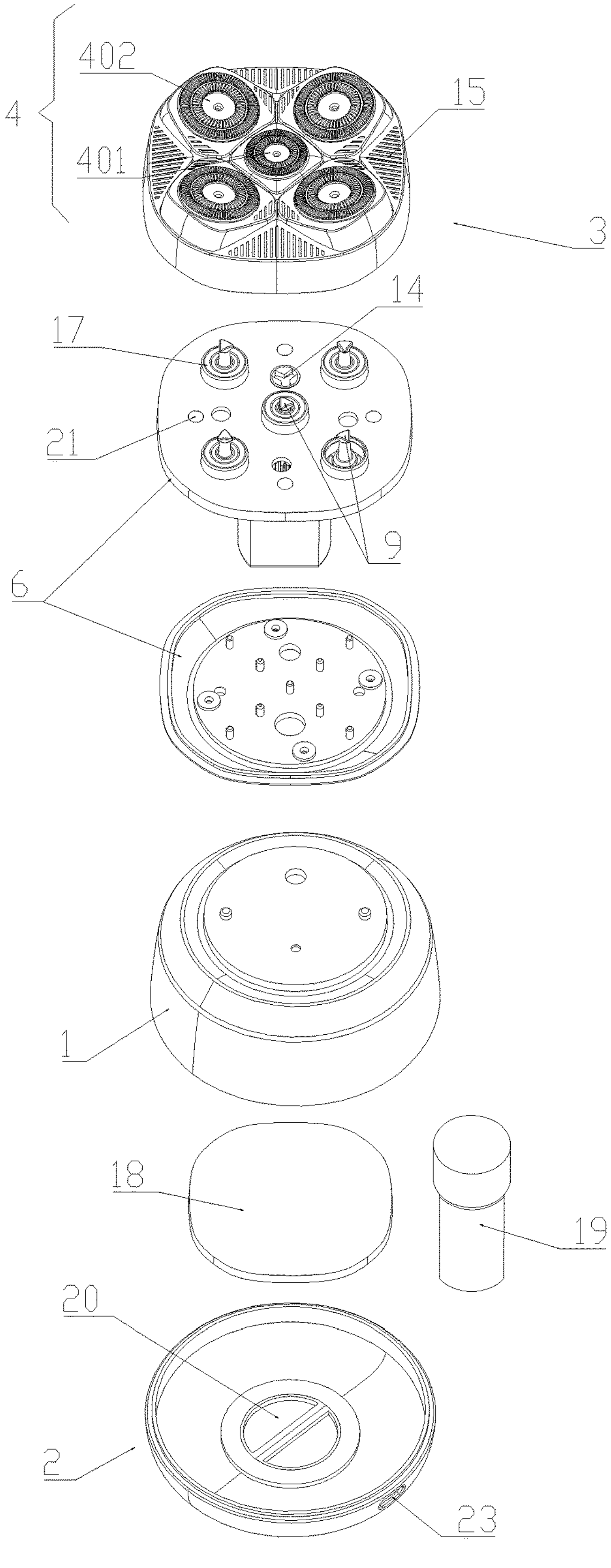
FIG. 4 is a first exploded view of the multi-head electric shaver.
Figure 5:
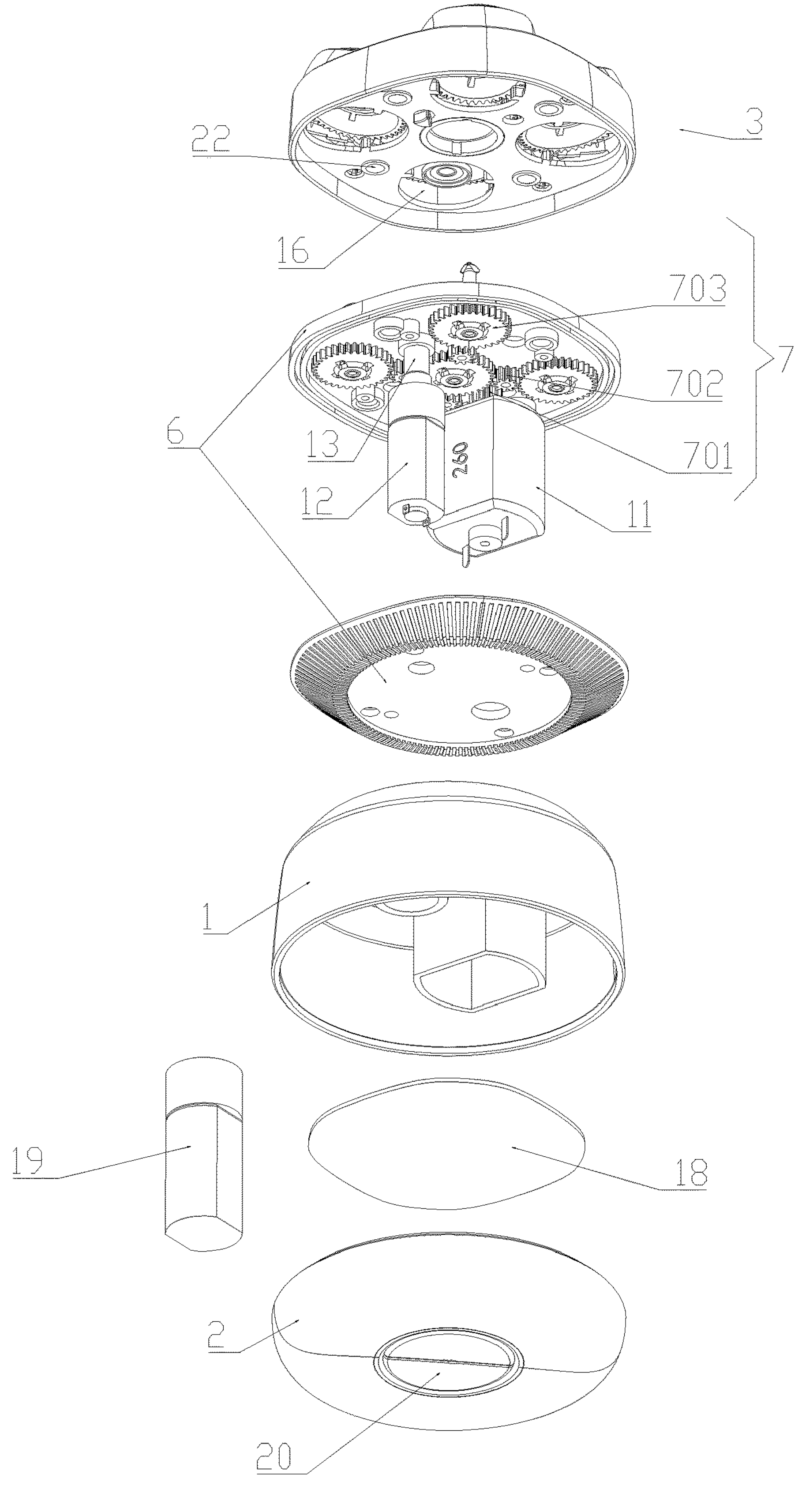
FIG. 5 is a second exploded view of the multi-head electric shaver.
Figure 6:
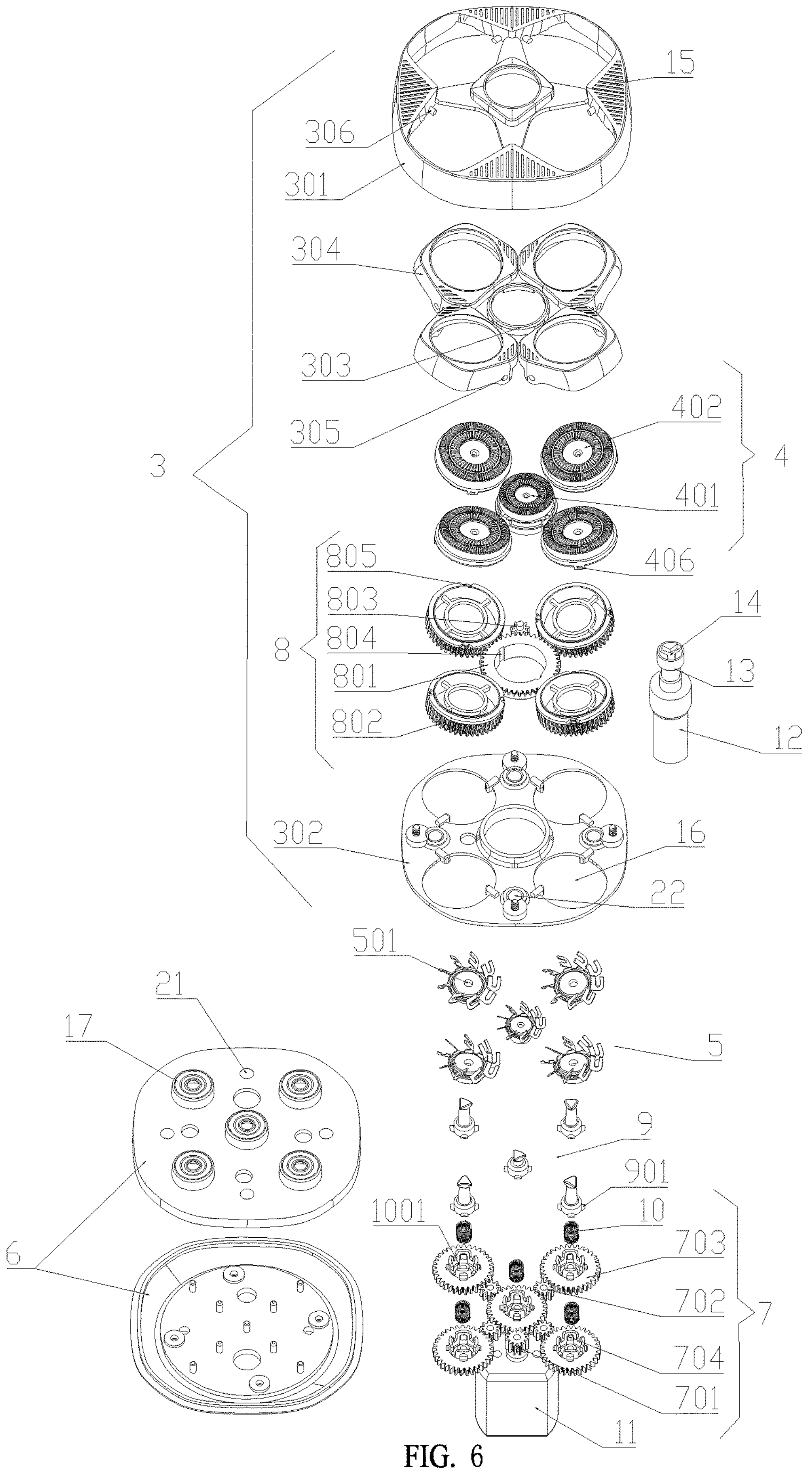
FIG. 6 is a third exploded view of the multi-head electric shaver, in which part of a main body is hidden.
Figure 7:
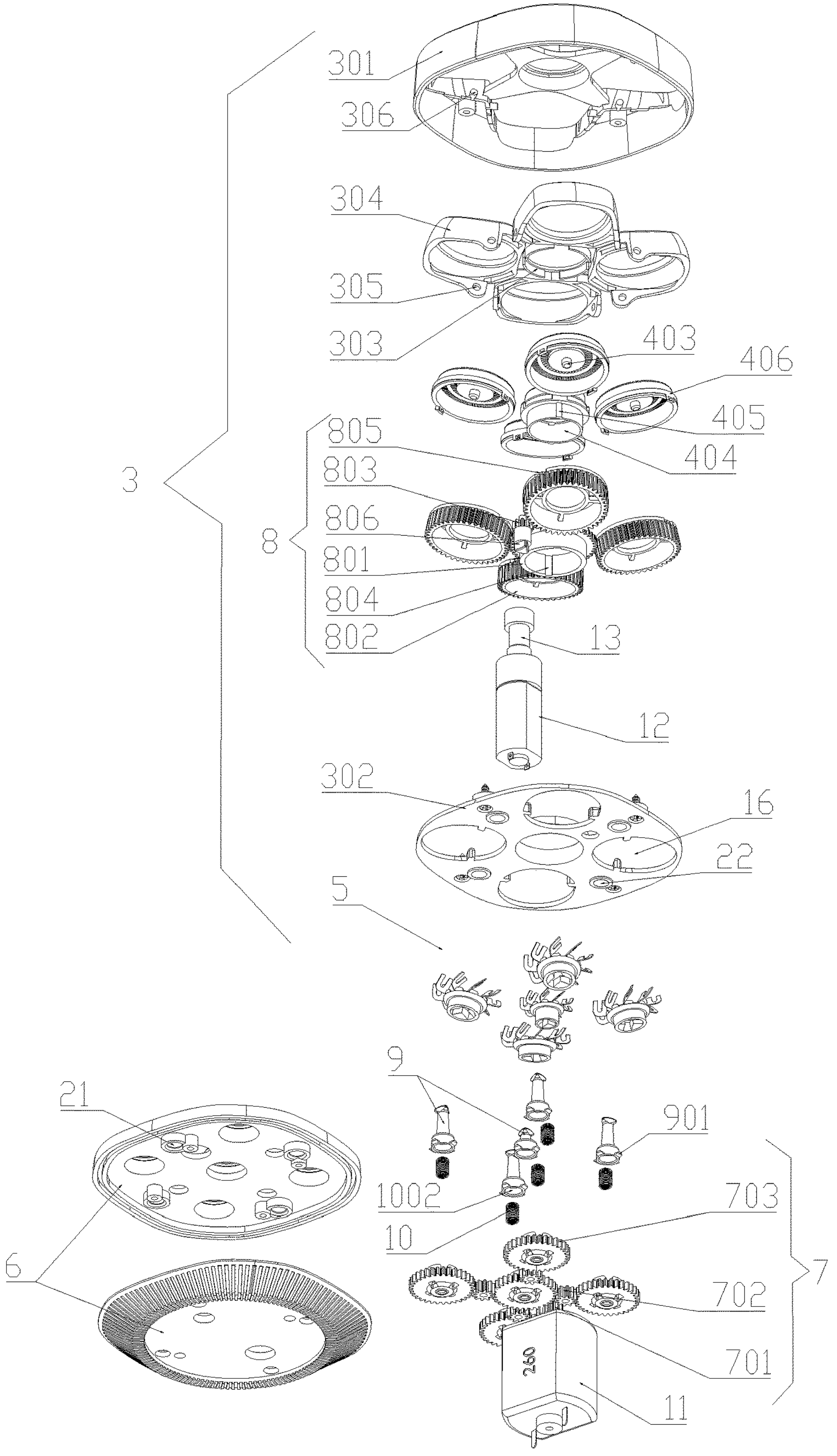
FIG. 7 is a fourth exploded view of the multi-head electric shaver, in which part of a main body is hidden.
Figure 8:
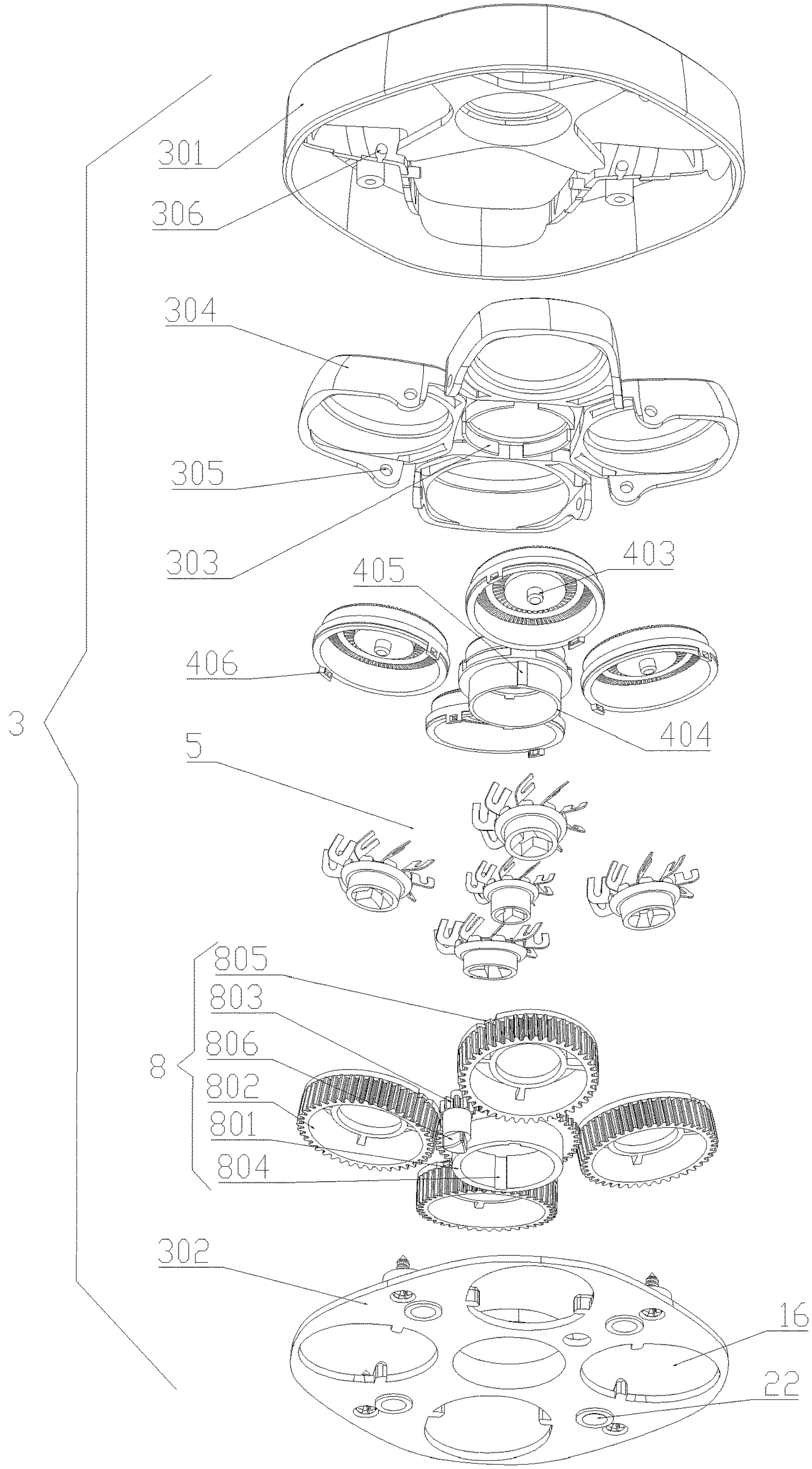
FIG. 8 is an exploded view of a shaving component.
Figure 9:
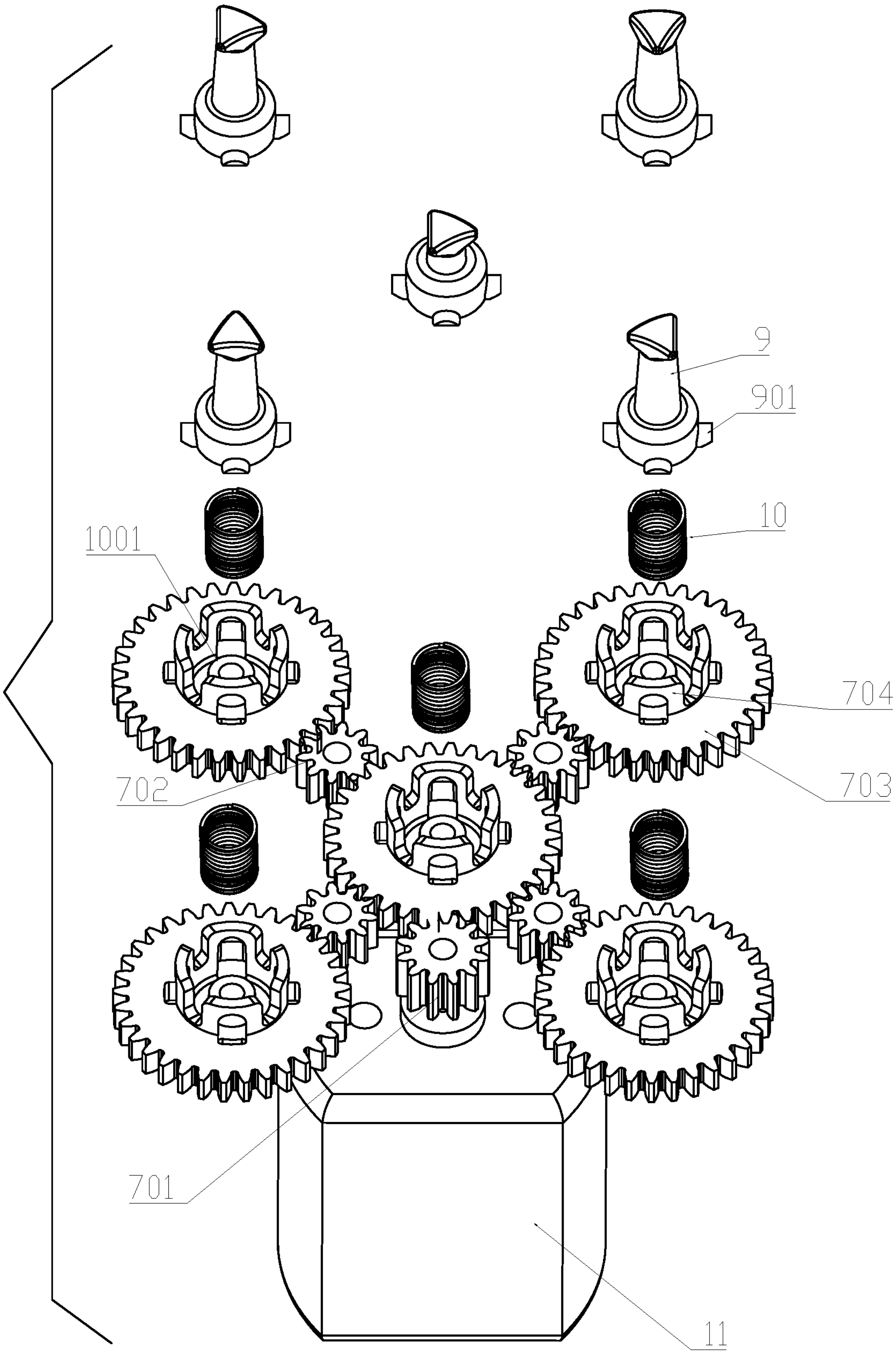
FIG. 9 is an exploded view of a first gear set.

A dual-power multi-head electric shaver is provided, which has two or more shaver heads. Take a shaver with five shaver heads as an example, its specific structure is shown in FIGS. 1-9, which comprises a main body housing 1 and a main body bottom case 2, wherein a detachable multi-head shaving component 3 is arranged above the main body housing 1, and the shaving component 3 comprises a plurality of screens 4; blades 5 are correspondingly arranged in the screens 4, a first gear set 7 for driving the blades 5 to rotate is arranged below the shaving component 3, a second gear set 8 for driving the screens 4 to rotate is arranged in the shaving component 3, and a first motor 11 and a second motor 12 for respectively driving the first gear set 7 and the second gear set 8 to rotate are arranged in the main body housing 1; a gear box 6 is arranged between the shaving component 3 and the main body housing 1, the gear box 6 is fixedly mounted at a top end of the main body housing 1, and the first gear set 7 is mounted in the gear box 6; and the shaving component 3 further comprises a shell 301 and a bottom plate 302 fixedly connected with the shell 301, and the second gear set 8 is arranged in the shell 301.

The dual-motor structure can simplify the transmission structure of the gear sets and facilitate the adjustment of the rotating speed ratio between the motors and the gears; the first motor 11 and the second motor 12 respectively drive the first gear set 7 and the second gear set 8 to rotate, so that the blades 5 of the shaver heads rotate rapidly to cut hair, and the screens 4 of the shaver heads rotate slowly, allowing long hair to be captured in the screens 4 to be cut, so that a thorough shaving effect is realized; moreover, the slow rotation of the screens 4 enables short hair to easily enter from various directions, resulting in a cleaner and more uniform shaving effect. Meanwhile, since the plurality of transmission gears 702 have the same size and the plurality of rotation gears 703 have the same size, the rotation directions and speeds of the blades 5 are the same, the rotation directions of the first screen 401 at the center and two of the second screens 402 are the same as those of the blades 5, the rotation directions of the other two second screens 402 are opposite to those of the blades 5, and the rotating speed of the blades 5 is much higher than that of the screens 4, so as to ensure the cutting effect of the multi-head electric shaver. Moreover, the different rotating directions of the second screens 402 enable hair to be guided into the second screens 402 from multiple directions, thus improving the shaving efficiency.

Specifically, the first gear set 7 comprises a driving gear 701, transmission gears 702 and rotating gears 703, the driving gear 701 is fixedly mounted on a motor shaft of the first motor 11, and the transmission gears 702 are located between the rotating gears 703; and a plurality of transmission connecting rods 9 rotating synchronously with the rotating gears 703 are arranged between the blades 5 and the first gear set 7, the blades 5 are movably sleeved on upper ends of the transmission connecting rods 9, and top ends of the rotating gears 703 are connected with lower ends of the corresponding transmission connecting rods 9. Taking a shaver with 5 shaver heads as an example, five rotating gears 703 are arranged, corresponding to the five shaver heads of the shaver. One of the rotating gears 703 is arranged at the center, and the other four are arranged on the periphery. The driving gear 701 meshes with the rotating gear 703 at the center. Four transmission gears 702 are arranged and located between the rotating gears 703 on the periphery and the rotating gear 703 at the center.

Further, a first groove 1001 is formed in a center of a top end of the rotating gear 703, and a plurality of snap-fit receivers 704 are arranged around the first groove 1001; a second groove 1002 is formed in a lower end of the transmission connecting rod 9, and a plurality of snap-fit heads 901 fitted into the snap-fit receivers 704 are arranged around the second groove 1002; the transmission connecting rod 9 is clamped onto a top end of the rotating gear 703 in a vertically movable manner, a spring 10 is arranged between the rotating gear 703 and the transmission connecting rod 9 to abut against the transmission connecting rod 9 in order to ensure the contact between the blade 5 and the screen 4, and one end of the spring 10 rests inside the first groove 1001, while the other end rests inside the second groove 1002. The spring 10 jacks up the transmission connecting rod 9 which abuts against the blade 5, ensuring that the blade 5 rotates in close contact with the screen 4, thereby ensuring the cutting force of the shaver and solving the problem of hair being easily trapped during shaving.

Specifically, the second gear set 8 comprises a first rotating gear 801, second rotating gears 802 and a power gear 803, the power gear 803 rotates synchronously with a motor shaft of the second motor 12, and the power gear 803 meshes with the first rotating gear 801; and the plurality of second rotating gears 802 are distributed around the first rotating gear 801, and the first rotating gear 801 meshes with the plurality of second rotating gears 802; and the screens 4 comprise a first screen 401 and second screens 402, and the first screen 401 and the second screens 402 are fixedly mounted on the first rotating gear 801 and the second rotating gears 802 respectively and rotate synchronously therewith. One first rotating gear 801 is arranged and located at the center, and four second rotating gears 802 are arranged and distributed around the first rotating gear 801. Because the first rotating gear 801 directly meshes with the four second rotating gears 802, when the first rotating gear 801 rotates clockwise, two of the second rotating gears 802 will drive the second screens 402 to rotate clockwise, and the other two second rotating gears 802 will drive the second screens 402 to rotate anticlockwise.

Specifically, the first rotating gear 801 is hollow, slots 804 are formed in an inner wall of the first rotating gear 801, a sleeve part 404 is fixedly mounted on the first screen 401, and an exterior surface of the sleeve part 404 is provided with ribs 405 inserted into the slots 804; and snap-fit points 805 are arranged on two sides of an upper end of the second rotating gear 802, and snap-fit rings 406 for locking the snap-fit points 805 are arranged on an outer side of a lower end of the second screen 402. The first screen 401 is tightly connected with the first rotating gear 801 in an insertion manner through the sleeve part 404, and the second screens 402 and the second rotating gears 802 are fastened together through the snap-fit rings 406, ensuring convenient assembly of the shaving component 3 and ensuring synchronized rotation of the gears and the screens.

Specifically, a transmission rod 13 is fixedly mounted on the motor shaft of the second motor 12, an engage groove 14 is formed in a top end of the transmission rod 13, and an engage tooth 806 inserted into the engage groove 14 is arranged at a bottom end of the power gear 803. The engage tooth 806 is polygonal to ensure that the power gear 803 rotates synchronously with the motor shaft of the second motor 12. Because the power gear 803 is installed on the bottom plate 302 and is driven by the inserting connection of the engage groove 14 and the engage tooth 806, the mounting and dismounting of the shaving component 3 are facilitated.

Specifically, the first screen 401 and the second screens 402 are sleeved with a first sleeve shell 303 and second sleeve shells 304 respectively, the first sleeve shell 303 is located at a center of the shell 301, and the second sleeve shells 304 are distributed on a periphery of the shell 301; and insertion holes 305 are formed in two sides of the second sleeve shell 304, rotating shafts 306 inserted into the insertion holes 305 are correspondingly arranged in the shell 301, a downward extending positioning post 403 is arranged at a center of an inner top of each screen 4, and a positioning hole 501 for receiving the positioning post 403 is formed in a top end of each blade 5. The first sleeve shell 303 and the first screen 401 are located at the center of the shell 301 to allow hair in all directions to be guided into the first screen 401, without the need of rotating adjustment of the shaving angle of the first screen 401. The second sleeve shells 304 and the second screens 402 are distributed on the periphery of the shell 301, and the inclination angle of the second screen 402 can be adjusted through the insertion hole 305 and the rotating shaft 306; when the second sleeve shell 304 tilts under a force, the second sleeve shell 304 will drive the second screen 402 and the corresponding blade 5 to tilt, and the positioning post 403 and the positioning hole 501 can ensure that the corresponding blade 5 and the second screen 402 have the same tilt angle, so as to ensure that the blade 5 and the second screen 402 remain in a joint state and ensure the cutting force of the shaver. Because the blade 5 is movably sleeved on the upper end of the transmission connecting rod 9, and the upper end of the transmission connecting rod 9 is polygonal, even if the blade 5 is in a tilting state, the transmission connecting rod 9 can drive the blade 5 to rotate quickly to cut hair, and the second screen 402 can be adjusted according to the surface radian of a shaved area, allowing an optimal angle with the skin during shaving, so as to enhance the shaving effect and user experience of the multi-head electric shaver.

Specifically, an upper surface of the shell 301 is provided with a plurality of hair guiding grooves 15 for guiding hair to the screens 4, and the hair guiding grooves 15 are distributed on an outer side of the screen 4 and can guide hair to the screen 4 from all directions, thereby improving shaving efficiency. The bottom plate 302 is provided with a plurality of cleaning holes 16, and after the multi-head electric shaver is used, the shaving component can be removed to be cleaned, hair in the shell 301 can be easily poured out or directly washed off through the cleaning holes 16. Dustproof pads 17 are arranged at a top end of the gear box 6 and sleeved on the transmission connecting rods 9 to prevent hair from falling into the gear box 6. The dustproof pads 17 can block the cleaning holes 16 and gaps at the top of the gear box 6 without affecting the rotation of the transmission connecting rods 9. This allows hair to stay in the shell 301 for centralized cleaning after shaving, making it easy to clean and preventing the cut hair from affecting the rotation of the first gear set 7.

Specifically, a top surface of the gear box 6 is provided with first magnetic parts 21, and a bottom surface of the bottom plate 302 is correspondingly provided with second magnetic parts 22 which attract the first magnetic parts 21. The shaving component 3 can be connected with the main body by magnetic attraction, and can also be connected with the main body by fastening, sleeving, etc., providing convenience for dismounting the shaving component 3 for cleaning after use.

Further, a control circuit board 18 and a battery 19 are arranged in the main body housing 1, a key switch 20 and a charging interface 23 are arranged on the main body bottom case 2, the charging interface 23 is electrically connected with the battery 19, and the control circuit board 18 is electrically connected with the key switch 20, the first motor 11 and the second motor 12.

The embodiments described herein are merely exemplary preferred embodiments of the invention. The invention is not limited to the precise structure described above and shown in the attached drawings, and various modifications and changes can be made without departing from its scope. Under the premise of not departing from the design idea of the invention, various modifications and improvements made by engineers and technicians in this field to the technical scheme of the invention shall fall within the protection scope of the invention.

What is claimed is:

1. A dual-power multi-head electric shaver, comprising a main body housing (1) and a main body bottom case (2), wherein a detachable multi-head shaving component (3) is arranged above the main body housing (1), and the shaving component (3) comprises a plurality of screens (4); blades (5) are correspondingly arranged in the plurality of screens (4), a first gear set (7) for driving the blades (5) to rotate is arranged below the shaving component (3), a second gear set (8) for driving the plurality of screens (4) to rotate is arranged in the shaving component (3), a first motor (11) for driving the first gear set (7) to rotate is arranged in the main body housing (1), and a second motor (12) for driving the second gear set (8) to rotate is arranged in the main body housing (1); a gear box (6) is arranged between the shaving component (3) and the main body housing (1), the gear box (6) is fixedly mounted at a top end of the main body housing (1), and the first gear set (7) is mounted in the gear box (6); and the shaving component (3) further comprises a shell (301) and a bottom plate (302) fixedly connected with the shell (301), and the second gear set (8) is arranged in the shell (301); wherein the first gear set (7) comprises a driving gear (701), transmission gears (702) and rotating gears (703), the driving gear (701) is fixedly mounted on a motor shaft of the first motor (11), and the transmission gears (702) are located between the rotating gears (703); and a plurality of transmission connecting rods (9) rotating synchronously with the rotating gears (703) are arranged between the blades (5) and the first gear set (7), the blades (5) are movably sleeved on upper ends of the plurality of transmission connecting rods (9), and top ends of the rotating gears (703) are connected with lower ends of the corresponding plurality of transmission connecting rods (9).

2. The dual-power multi-head electric shaver according to claim 1, wherein a first groove (1001) is formed in a center of a top end of each of the rotating gears (703), and a plurality of snap-fit receivers (704) are arranged around the corresponding first groove (1001); a second groove (1002) is formed in a lower end of each of the plurality of transmission connecting rods (9), and a plurality of snap-fit heads (901) fitted into the snap-fit receivers (704) are arranged around the corresponding second groove (1002); each of the plurality of transmission connecting rods (9) is clamped onto a top end of one of the rotating gears (703) in a vertically movable manner, a spring (10) is arranged between each of the rotating gears (703) and the corresponding transmission connecting rod (9) to abut against the corresponding transmission connecting rod (9) in order to ensure the contact between the blades (5) and the plurality of screens (4), and one end of the spring (10) rests inside the corresponding first groove (1001), while the other end rests inside the corresponding second groove (1002).

3. The dual-power multi-head electric shaver according to claim 1, wherein an upper surface of the shell (301) is provided with a plurality of hair guiding grooves (15) for guiding hair to the plurality of screens (4), the bottom plate (302) is provided with a plurality of cleaning holes (16), and dustproof pads (17) are arranged at a top end of the gear box (6) and sleeved on the plurality of transmission connecting rods (9) to prevent hair from falling into the gear box (6).

4. A dual-power multi-head electric shaver, comprising a main body housing (1) and a main body bottom case (2), wherein a detachable multi-head shaving component (3) is arranged above the main body housing (1), and the shaving component (3) comprises a plurality of screens (4); blades (5) are correspondingly arranged in the plurality of screens (4), a first gear set (7) for driving the blades (5) to rotate is arranged below the shaving component (3), a second gear set (8) for driving the plurality of screens (4) to rotate is arranged in the shaving component (3), a first motor (11) for driving the first gear set (7) to rotate is arranged in the main body housing (1), and a second motor (12) for driving the second gear set (8) to rotate is arranged in the main body housing (1); a gear box (6) is arranged between the shaving component (3) and the main body housing (1), the gear box (6) is fixedly mounted at a top end of the main body housing (1), and the first gear set (7) is mounted in the gear box (6); and the shaving component (3) further comprises a shell (301) and a bottom plate (302) fixedly connected with the shell (301), and the second gear set (8) is arranged in the shell (301); wherein the second gear set (8) comprises a first rotating gear (801), second rotating gears (802) and a power gear (803), the power gear (803) rotates synchronously with a motor shaft of the second motor (12), and the power gear (803) meshes with the first rotating gear (801); and the plurality of second rotating gears (802) are distributed around the first rotating gear (801), and the first rotating gear (801) meshes with the plurality of second rotating gears (802).

5. The dual-power multi-head electric shaver according to claim 4, wherein the plurality of screens (4) comprise a first screen (401) and second screens (402), and the first screen (401) and the second screens (402) are fixedly mounted on the first rotating gear (801) and the second rotating gears (802) respectively and rotate synchronously therewith; the first rotating gear (801) is hollow, slots (804) are formed in an inner wall of the first rotating gear (801), a sleeve part (404) is fixedly mounted on the first screen (401), and an exterior surface of the sleeve part (404) is provided with ribs (405) inserted into the slots (804); and snap-fit points (805) are arranged on two sides of an upper end of each of the second rotating gears (802), and snap-fit rings (406) for locking the snap-fit points (805) are arranged on an outer side of a lower end of each of the second screens (402).

6. The dual-power multi-head electric shaver according to claim 5, wherein the first screen (401) and the second screens (402) are sleeved with a first sleeve shell (303) and second sleeve shells (304) respectively, the first sleeve shell (303) is located at a center of the shell (301), and the second sleeve shells (304) are distributed on a periphery of the shell (301); and insertion holes (305) are formed in two sides of each of the second sleeve sleeves (304), rotating shafts (306) inserted into the insertion holes (305) are correspondingly arranged in the shell (301), a downward extending positioning post (403) is arranged at a center of an inner top of each of the plurality of screens (4), and a positioning hole (501) for receiving the positioning post (403) is formed in a top end of each blade (5).

7. The dual-power multi-head electric shaver according to claim 4, wherein a transmission rod (13) is fixedly mounted on the motor shaft of the second motor (12), an engage groove (14) is formed in a top end of the transmission rod (13), and an engage tooth (806) inserted into the engage groove (14) is arranged at a bottom end of the power gear (803).

* * * * *